US009280375B1

(12) United States Patent
Youseff et al.

(10) Patent No.: US 9,280,375 B1
(45) Date of Patent: Mar. 8, 2016

(54) DYNAMICALLY ADJUSTABLE VIRTUAL MACHINE

(71) Applicant: Google Inc., Mountain View, CA (US)

(72) Inventors: Lamia A. M. Youseff, Seattle, WA (US); Cory Todd Maccarrone, Seattle, WA (US); Jonathan Bingham, Milpitas, CA (US); Eric Robert Northrup, Seattle, WA (US); Scott James Van Woudenberg, Seattle, WA (US); Grigory Makarevich, Bothell, WA (US)

(73) Assignee: Google Inc., Mountain View, CA (US)

( * ) Notice: Subject to any disclaimer, the term of this patent is extended or adjusted under 35 U.S.C. 154(b) by 38 days.

(21) Appl. No.: 14/265,904

(22) Filed: Apr. 30, 2014

(51) Int. Cl.
 *G06F 9/45* (2006.01)
 *G06F 9/455* (2006.01)

(52) U.S. Cl.
 CPC .................................. *G06F 9/45533* (2013.01)

(58) Field of Classification Search
 None
 See application file for complete search history.

(56) References Cited

U.S. PATENT DOCUMENTS

| | | | |
|---|---|---|---|
| 6,397,242 B1 | 5/2002 | Devine et al. | |
| 7,412,702 B1 | 8/2008 | Nelson et al. | |
| 7,797,707 B2 | 9/2010 | Cherkasova et al. | |
| 8,161,475 B2 | 4/2012 | Araujo, Jr. et al. | |
| 8,261,264 B2 | 9/2012 | Winter et al. | |
| 8,271,976 B2 | 9/2012 | Vega et al. | |
| 8,364,639 B1 | 1/2013 | Koryakina et al. | |
| 8,539,499 B1 | 9/2013 | Tovpeko et al. | |
| 2008/0049254 A1* | 2/2008 | Phan et al. | 358/1.16 |
| 2008/0163206 A1* | 7/2008 | Nair | 718/1 |
| 2009/0300638 A1* | 12/2009 | Gustafsson et al. | 718/104 |
| 2011/0010709 A1* | 1/2011 | Anand et al. | 718/1 |
| 2011/0126203 A1* | 5/2011 | Fahrig | G06F 9/5077 718/102 |
| 2012/0047516 A1* | 2/2012 | Barwick | G06F 9/491 718/108 |
| 2014/0115586 A1 | 4/2014 | Hong | |
| 2014/0137108 A1* | 5/2014 | Tsirkin et al. | 718/1 |
| 2014/0164545 A1* | 6/2014 | Davis et al. | 709/212 |
| 2014/0331222 A1* | 11/2014 | Zheng | 718/1 |

FOREIGN PATENT DOCUMENTS

| | | |
|---|---|---|
| EP | 2698711 A1 | 2/2014 |
| WO | WO-2013133586 A1 | 9/2013 |

* cited by examiner

*Primary Examiner* — Tuan Dao
(74) *Attorney, Agent, or Firm* — Honigman Miller Schwartz and Cohn LLP

(57) ABSTRACT

A system including a collection of local data processing devices and a collection of remote data processing devices. At least one local data processing device executes instructions configuring the at least one local data processing device to implement a resource manager, a virtual machine, and a virtual machine manager. The resource manager associates application threads of a software application executing on a data processing device with local processors. The virtual machine includes a plurality of virtual processors, and each virtual processor emulates a data processing device. The virtual machine associates local processors with virtual processors. Finally, the virtual machine manager associates at least one virtual processor with a local data processing device and at least one virtual processor with a remote data processing device.

20 Claims, 9 Drawing Sheets

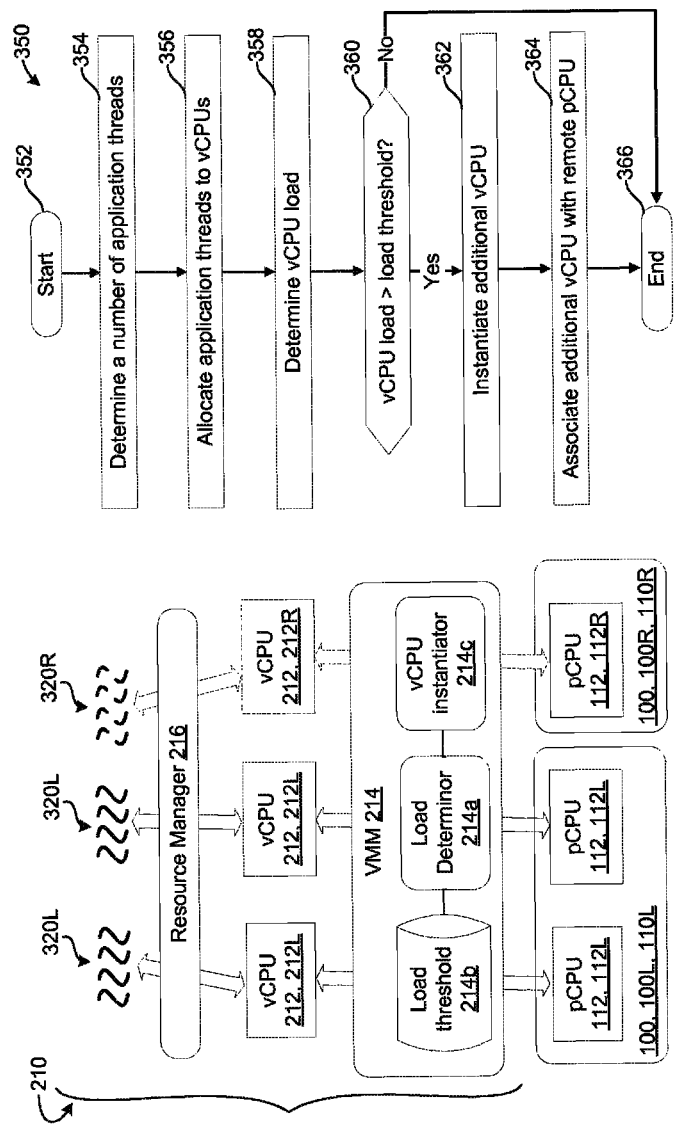

DYNAMICALLY ADJUSTABLE VIRTUAL MACHINE

TECHNICAL FIELD

This disclosure relates to virtual machines executable on a data processing device.

BACKGROUND

A data processing device may include one or more physical processors. The physical processors may execute instructions configuring the data processing device to instantiate an instance of a virtual machine. Moreover, the virtual machine may have one or more virtual processors and each virtual processor may emulate a corresponding physical processor. The virtual machine may execute an operating system and a software application.

SUMMARY

One aspect of the disclosure provides a system including a collection of local data processing devices and a collection of remote data processing devices. At least one local data processing device executes instructions configuring the at least one local data processing device to implement a resource manager, a virtual machine, and a virtual machine manager. The resource manager associates application threads of a software application executing on a data processing device with local processors. The virtual machine includes a plurality of virtual processors, and each virtual processor emulates a data processing device. The virtual machine associates local processors with virtual processors. Finally, the virtual machine manager associates at least one virtual processor with a local data processing device and at least one virtual processor with a remote data processing device.

In some implementations, the virtual machine manager determines a number of application threads and a number of virtual processors of the virtual machine. The virtual machine manager may determine the number of application threads by counting the number of application threads. Alternatively, a software application may specify the number of application threads, for example as metadata. The virtual machine manager compares the number of application threads with the number of virtual processors and instantiates one or more additional virtual processors based on the comparison. In some examples, the virtual machine manager gauges a computation load of the application threads. The virtual machine manager configures the additional one or more virtual processors to emulate corresponding remote data processing devices and assigns one or more application threads to the additional one or more virtual processors.

In some implementations, the resource manager allocates application threads among the local processors. The virtual machine manager and/or the resource manager maintain a threshold range of application threads associated with each local processor by instantiating or removing local processors when the number of application threads per local processor is outside the threshold range.

The virtual machine may instantiate or remove virtual processors to maintain a one-to-one association of local processors to virtual processors. The virtual machine manager and/or the resource manager may instantiate one or more remote processors after all the local processors have been instantiated. The virtual machine manager and/or the resource manager may remove all the remote processors before removing a local processor. The resource manager may migrate all application threads executing on a remote processor to the local processors before removing the remote processor.

In some implementations, the virtual machine manager replicates the remote data processing device by instantiating a replica of the remote data processing device. The virtual machine manager may switch over to the replica when the remote data processing device fails or become unresponsive. The virtual machine manager may determine an amount of time that has passed since a last communication with the remote data processing device. Moreover, the virtual machine may switch the virtual processor executing on the remote data processing device to the replica of the remote data processing device, in response to the amount of time exceeding a threshold period of time.

The remote data processing device may include a non-transitory remote memory, and the virtual machine may be configured to directly access the non-transitory remote memory without communicating with the remote processors. For example, the virtual machine may access the remote memory using remote direct memory access (RDMA). In some implementations, the virtual machine may use remote memory and local memory. However, a resource manager and/or a software application executing on the virtual machine may be unaware of the difference between the local memory and the remote memory. In other words, to the resource manager and/or the software application, the remote memory and the local memory may appear as a single contiguous block of memory.

Another aspect of the disclosure provides a computer-implemented method. The method includes executing instructions on a local data processing device to implement a virtual machine. The virtual machine includes virtual processors that emulate physical processors. The method includes associating one or more of the virtual processors with local processors in the local data processing device. The method further includes associating at least one virtual processor with a remote processor in a remote data processing device.

In some implementations, the method includes executing a software application in the virtual machine. The software application includes application threads. The method includes associating at least one application thread with the local processor in the local data processing device and associating at least another application thread with the remote processor in the remote data processing device.

In some implementations, the method includes determining a number of application threads and a number of virtual processors of the virtual machine. The method may determine the number of application threads by counting the number of application threads. Alternatively, the method may determine the number of application threads by receiving the number of application threads from the software application. The method may include gauging a computation load of the application threads. The method includes comparing the number of application threads with the number of virtual processors and instantiating one or more additional virtual processors based on the comparison. The method further includes configuring the additional one or more virtual processors to emulate corresponding remote processors in a remote data processing device and assigning one or more application threads to the additional one or more virtual processors.

The method may include allocating application threads among the local processors. The method may further include maintaining a threshold range of application threads associated with each local processor by instantiating or removing local processors when the number of application threads per local processor is outside the threshold range. In some implementations, the method includes instantiating or removing virtual processors to maintain a one-to-one association of local processors to virtual processors. The method may include instantiating one or more remote processors after all the local processors have been instantiated.

In some implementations, the method includes removing all the remote processors before removing a local processor. The method may further include migrating all application threads executing on the remote processors to the local processors before removing the remote processors.

The method may include replicating the remote data processing device by instantiating a replica of the remote data processing device. The method may further include determining an amount of time that has passed since a last communication with the remote data processing device. The method may also include switching the virtual processor executing on the remote data processing device to the replica of the remote data processing device, in response to the amount of time exceeding a threshold period of time. In some implementations, the method includes accessing a non-transitory remote memory associated with the remote data processing device without communicating with the remote processors.

Yet another aspect of the disclosure provides a system for executing a virtual machine. The system includes a local data processing device including local processors and a remote data processing device including remote processors. The local data processing device executes instructions configuring the local data processing device to implement a virtual machine having a plurality of virtual processors. The virtual machine can execute a software application with multiple application threads. A virtual machine manager associates each virtual processor with a corresponding local processor and allocates the application threads to the virtual processors. The virtual machine manager determines a current load of the virtual processors and instantiates an additional virtual processor when the current load exceeds a threshold. The virtual machine manager associates the additional virtual processor with a remote processor when all the local processors are already associated with virtual processors.

In some implementations, the virtual machine manager removes the virtual processor associated with the remote processor when the current load is below the threshold. The virtual machine manager may determine the current load of the virtual processors by determining a number of application threads, determining a number of virtual processors in the virtual machine and comparing the number of application threads with the number of virtual processors. In other implementations, the virtual machine manager may determine the current load of the virtual processors by determining the number of application threads allocated to the virtual processors. In other implementations, the virtual machine manager may determine the current load of the virtual processors by determining the percentage of time the virtual processors are idle. The virtual machine manager may instantiate or remove virtual processors to maintain the idle time within a threshold range of percentages.

The remote data processing device may include a non-transitory remote memory. The virtual machine may be configured to directly access the remote memory without communicating with the remote processors, for example, using remote direct memory access (RDMA). The virtual machine may use remote memory in combination with local memory. The virtual machine may present the remote memory and the local memory as a single contiguous block of memory to the resource manager and/or the software application.

DESCRIPTION OF DRAWINGS

FIG. 3A is a block diagram of another example system for executing application threads of a software application on virtual processors of a virtual machine.

FIG. 3B is an example arrangement of operations for executing application threads of a software application on virtual processors of a virtual machine.

Like reference symbols in the various drawings indicate like elements.

DETAILED DESCRIPTION

Figure 1A:
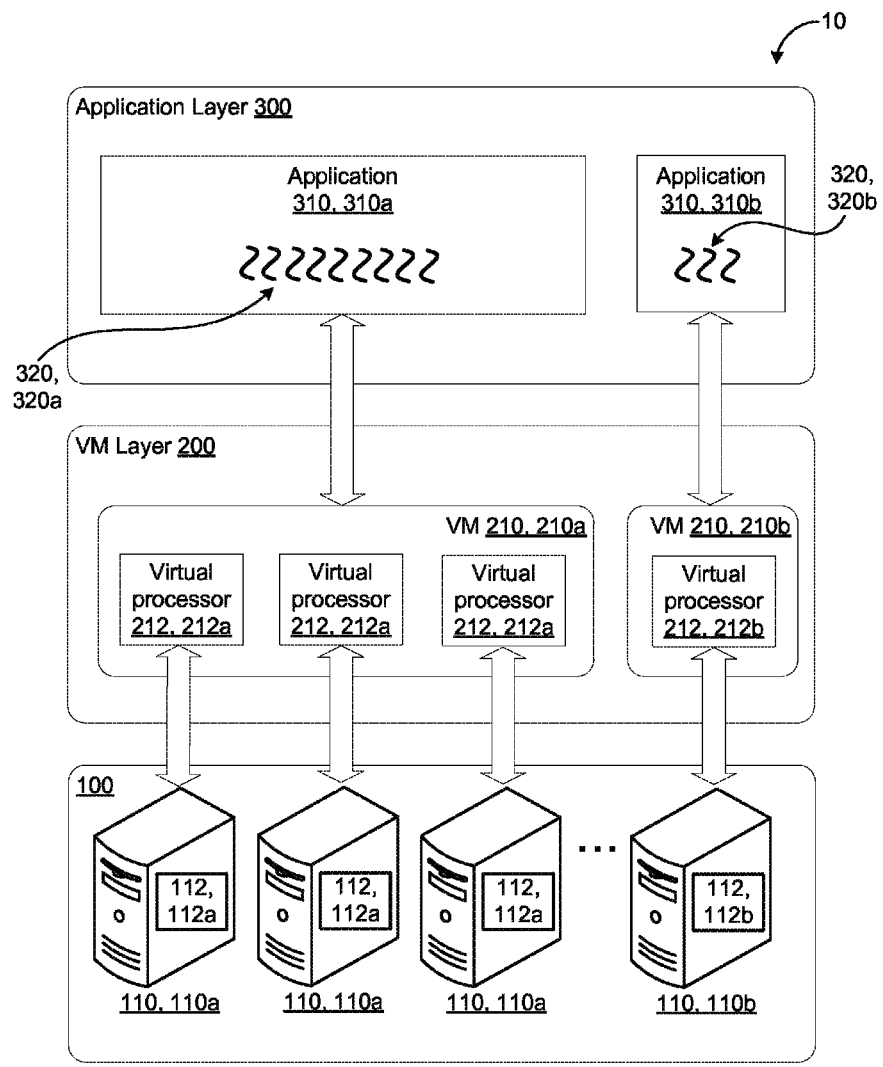
FIG. 1A is a block diagram of an example system for executing software applications in virtual machines.

FIG. 1A depicts an example system 10 for executing software applications in virtual machines. The system 10 includes a collection 100 of data processing devices 110, a virtual machine (VM) layer 200 and application layer 300. The data processing devices 110 may include a physical central processing unit (pCPU) 112 ("physical processor 112", hereinafter). In the example of FIG. 1A, the data processing devices 110 include a single physical processor 112. However, in other example implementations, the data processing devices 110 may include more than one physical processor 112.

The VM layer 200 includes one or more virtual machines 210. Each virtual machine 210 may include one or more virtual central processing units (vCPUs) 212 ("virtual processor 212", hereinafter). In the example shown, a first virtual machine 210a includes a first set 212a of one or more virtual processors 212 and a second virtual machine 210b includes a second set 212b of one or more virtual processors 212. While the second set 212b is shown as only including one virtual processor 212, any number of virtual processors 212 are possible. Each virtual processor 212 may emulate a physical processor 112. Referring again to the example shown, the first virtual processors 212a emulates a first set 112a of one or more physical processors 112, and the second virtual processor 212b emulates a second set 112b of one or more physical processors 112.

The application layer 300 includes applications 310 that may execute in the virtual machine(s) 210. In the example shown in FIG. 1A, a first application 310a executes in the first virtual machine 210a and a second application 310b executes in the second virtual machine 210b. The applications 310 may have application threads 320. In some implementations, the application threads 320 are separable or divisible chunks of the application 310 that can be executed on different virtual processors 212. The application 310 may identify the application threads 320 or, alternatively, the virtual machine 210 executing the application 310 may identify the application threads 320 in the application 310. The application 310 may identify the application threads 320 by separating the application threads 320 with a marker. Additionally or alternatively, the application 310 may specify the number of application threads 320, for example as metadata. By segregating the application 310 into separately executable application threads 320 the application 310 can be executed using multiple virtual processors 212.

As exemplified in FIG. 1A, the first application 310a includes application threads 320a and the second application 310b includes application threads 320d. Since the first application 310a has more application threads 320a than the second application 310b, the first application 310a may require more virtual processors 212 than the second application 310b. Accordingly, the first virtual machine 210a executing the first application 310a with more application threads 320a includes the first set 212a of three virtual processors 212, whereas the second virtual machine 210b executing the second application 310b with fewer application threads 320b includes the second set 210b of only a single virtual processor 210. The first virtual machine 210a allocates the application threads 320a of the first application 310a to each of the virtual processors 212, 212a in the first virtual machine 210a. Since the first set 212a of virtual processors 212 emulates the corresponding first set 112a of physical processors 112, once the first virtual machine 210a allocates the first application threads 320a to the associated virtual processors 212, 212a, the first set 112a of physical processors 112 execute the allocated application threads 320a.

Figure 1B:
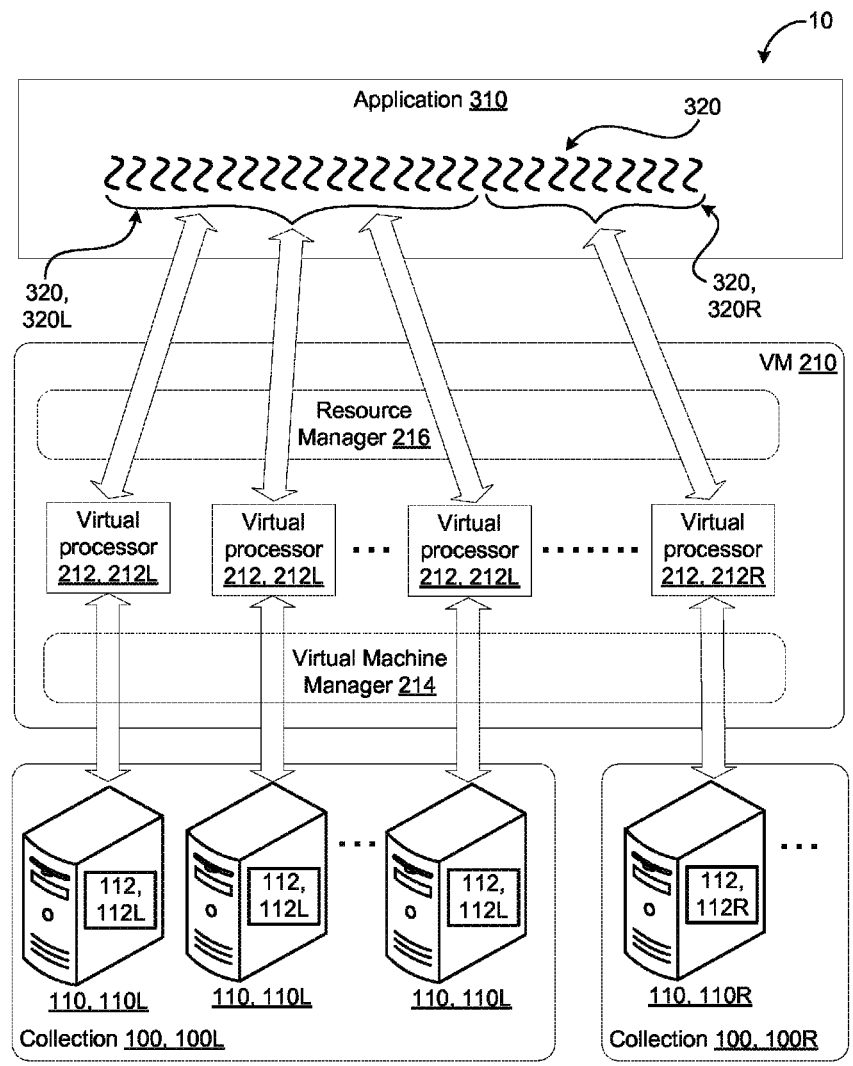
FIG. 1B is another block diagram of the example system depicted in FIG. 1A.

FIG. 1B depicts another possible implementation of the system 10. The system 10 is configured to execute the application 310 in the virtual machine 210. In the example of FIG. 1B, the collection 100 of data processing devices 110 includes a local collection 100L of local data processing devices 110L and a remote collection 100R of remote data processing devices 110R. The remote collection 100R is located at a different physical location than the local collection 100L. In other words, while the local data processing devices 110L are proximal to each other, the remote data processing devices 110R are distant from the local data processing devices 110L. For example, the remote collection 100R may be located in a different city, a different country or even a different continent than the local collection 100L. An advantage of having the remote collection 100R is that the remote collection 100R may not suffer from the same problems that the local collection 100L may suffer. Moreover, the remote collection 100R may be expanded upon demand (e.g., via association or allocation), whereas the local collection 100L may have a fixed size.

The virtual machine 210 may include a resource manager 216. The resource manager 216 may include an operating system that is executing in the virtual machine 210. The resource manager 216 allocates the application threads 320 among the virtual processors 212. The virtual processors 212 include local virtual processors 212L and at least one remote virtual processor 212R. Each local virtual processor 212L emulates a local physical processor 112L, whereas the remote virtual processor 212R emulates a remote physical processor 112R. Although the local physical processors 112L are located distant from the remote physical processor 112R, the local virtual processors 212L and the remote virtual processor 212R need not be stored in distant memory locations.

The virtual machine manager 214 maintains a mapping of the virtual processors 212 to the physical processors 112. The virtual machine manager 214 configures the local virtual processors 212L to emulate local physical processors 112L. The virtual machine manager 214 further configures the remote virtual processor 212R to emulate the remote physical processor 112R. FIG. 1B exemplifies a single remote virtual processor 212R emulating a single remote physical processor 112R. However, in other examples, the virtual machine manager 214 may instantiate additional remote virtual processors 212R. The virtual machine manager 214 may configure the additional remote virtual processors 212R to emulate additional remote physical processors 112R. In some implementations, the virtual machine manager 214 may instantiate the additional remote virtual processors 212R when a current load of the existing virtual processors 212 exceeds a maximum load threshold. Additionally or alternatively, the virtual machine manager 214 may instantiate the additional remote virtual processors 212R when the number of application threads 320 exceeds a threshold number of application threads.

In some implementations, the resource manager 216 categorizes the application threads 320 as local application threads 320L or remote application threads 320R based on various criteria. The resource manager 216 may allocate the local application threads 320L to local virtual processors 212L and the remote application threads 320R to the remote virtual processor 212R. Consequently, the resource manager 216 may cause the local physical processors 112L to execute the local application threads 320L and the remote physical processor 112R to execute the remote application threads 320R.

The resource manager 216 may categorize the application threads 320 into local application threads 320L and remote application threads 320R based on priorities of the application threads 320. In some implementations, the resource manager 216 determines the priorities of the application threads 320. Alternatively, the application 320 may associate a priority with at least some of the application threads 320. The resource manager 216 may designate application threads 320 with a high priority as local application threads 320L and applications threads 320 with a low priority as remote application threads 320R. Consequently, the local physical processors 112L execute the local application threads 320L that may have a high priority and the remote physical processor 112R executes the remote application threads 320R that may have a low priority.

In some implementations, the number of application threads 320 may vary while the virtual machine 210 executes the application 320. In some scenarios, the number of application threads 320 may increase. The number of application threads may increase for a variety of reasons, for example, more users may start using the application 310, the application 310 may be receiving more data from the user or the application 310 may be performing a task that requires more application threads 320. If the number of application threads 320 increases and virtual machine manager 214 keeps the number of virtual processors 212 constant, then the resource manager 216 allocates the additional application threads 320 to the existing virtual processors 212.

In order to maintain a fast response time for each virtual processor 212, the virtual machine manager 214, the resource manager 216, the application 310, a developer of the application 310 and/or a user of the application 310 may specify a threshold maximum number of application threads 320 that the resource manager 216 may allocate to each virtual processor 212. If the number of application threads 320 increases significantly, the number of application threads 320 allocated to the virtual processors 212 may exceed the threshold. In some implementations, when the number of application threads 320 allocated to a virtual processor 212 exceeds the threshold, the virtual machine manager 214 instantiates the remote virtual processor 212R. The virtual machine manager 212R maps or associates the newly-instantiated remote virtual processor 212R to a remote physical processor 112R, so that the remote virtual processor 212R emulates the remote physical processor 112R. The resource manager 216 detects the instantiation of the remote virtual processor 212R and allocates at least some of the application threads 320 to the remote virtual processor 212R. Advantageously, the number of virtual processors 212 in the virtual machine 210 is not limited by the number of local physical processors 112L in the local data processing devices 110L of the local collection 100L.

Figure 1C:
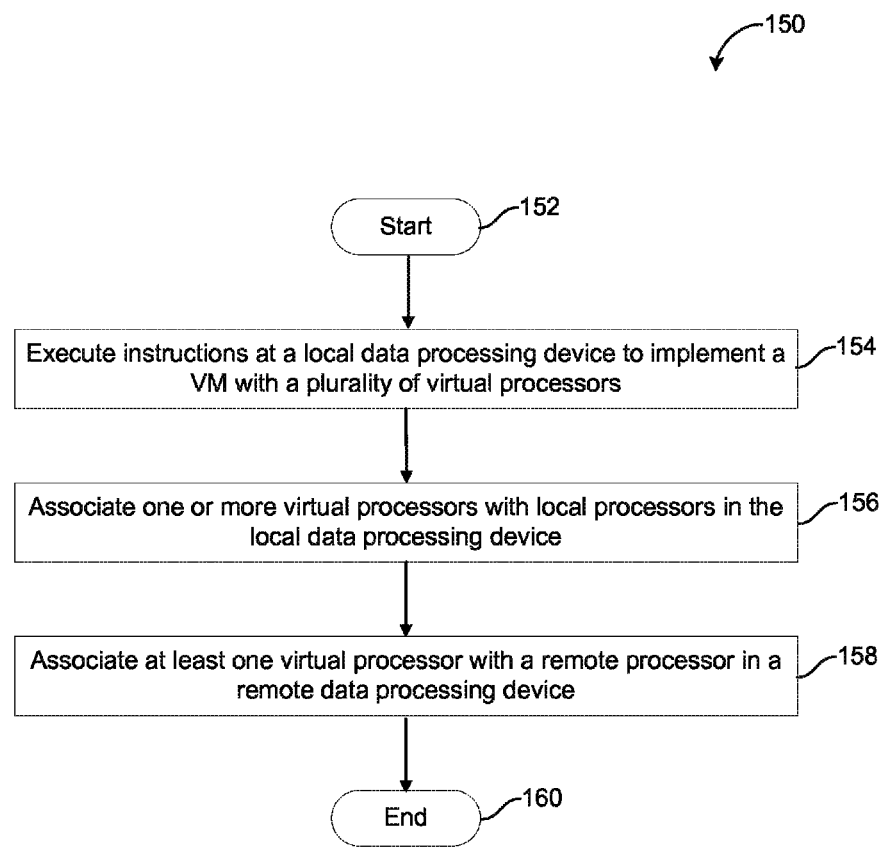
FIG. 1C is an example arrangement of operations for executing a software application in a virtual machine having virtual processors.

FIG. 1C depicts an example method 150 for executing an application 310 in the virtual machine 210. At 154, a local data processing device 110L executes instructions to implement the virtual machine 210. The virtual machine 210 includes a plurality of virtual processors 212. At 156, the virtual machine manager 214 associates one or more local virtual processors 212L with local physical processors 112L in the local data processing devices 110L of the local collection 100L. At 158, the virtual machine manager 214 associates at least one remote virtual processor 212R with a remote physical processor 112R in a remote data processing device 110R of a remote collection 100R.

The virtual machine manager 214 may instantiate additional remote virtual processors 212R and associate the additional remote virtual processors 212R with corresponding remote physical processors 112R in the remote collection 100R of the remote data processing devices 110R. In some implementations, the virtual machine manager 214 may instantiate the additional remote virtual processors 212R in response to the number of application threads 320 exceeding a threshold number of application threads. In some examples, the virtual machine manager gauges a computation load of the application threads 320 and instantiates additional remote virtual processors 212R to handle increased loads. Additionally or alternatively, the virtual machine manager 214 may instantiate an additional remote virtual processor 212R in response to losing communication with a local virtual processor 212L or the local virtual processor 212L becoming unresponsive. The resource manager 216 may transfer or migrate the application threads 320 from an unresponsive local virtual processor 212L to a newly-instantiated remote virtual processor 212R.

Figure 2A:
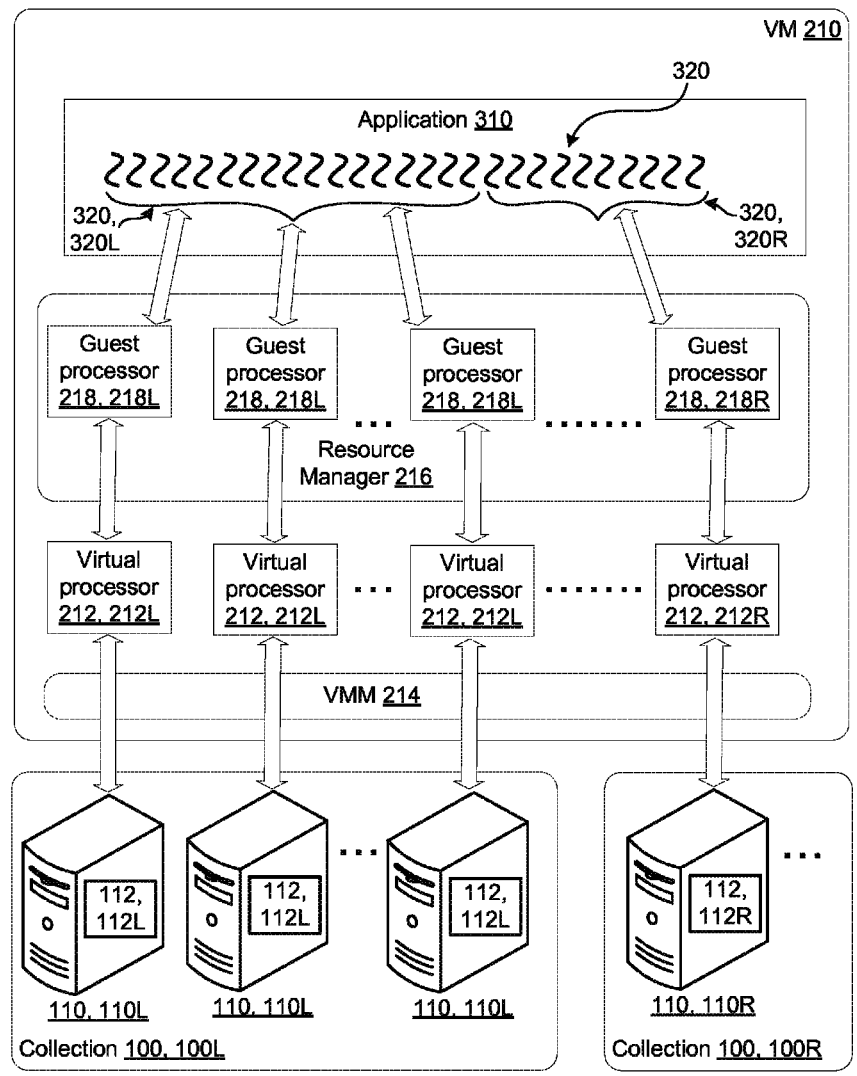
FIG. 2A is a block diagram of an example virtual machine interfaced with a collection of data processing devices.

FIG. 2A depicts an example implementation of a virtual machine 210 interfaced with a local collection 100L of local data processing device 110L and a remote collection 100R of remote data processing devices 110R. The virtual machine 210 includes a resource manager 216 and the resource manager 216 includes guest central processing units (gCPUs) 218 ("guest processors 218", hereinafter). The resource manager 216 maps the guest processors 218 to the virtual processors 212 and virtual machine manager 214 maps the virtual processors 212 to the physical processors 112. The guest processors 218 may include high level programming functions or application programming interfaces (APIs) that the application 310 may use to interact with the virtual processors 212. The guest processors 212 allow a developer of the application 310 to write the application 310 in a high-level programming language (e.g. Java, C++, or the like) as opposed to a low-level programming language (e.g. Assembly, or binary code). Therefore, the application 310 is not restricted to use a low level programming language in order to interact with the virtual processors 212.

The guest processors 218 may include local guest processors 218L and a remote guest processor 218R. The resource manager 216 maps the local guest processors 218L to the local virtual processors 212L that emulate local physical processors 112L. The resource manager 216 further maps the remote guest processor 218R to the remote virtual processor 212R that emulates the remote physical processor 112R. Although the guest processors 218 are denoted as local guest processors 218L and remote guest processors 218R, the remote guest processor 218R may be stored in the same memory as the local guest processors 218L. In other words, the remote guest processor 218R need not be in a different location than the local guest processor 218L. However, as stated earlier, the remote physical processor 112R is located at a different location from the local physical processor 112L.

In operation, the resource manager 216 allocates the application threads 320 to the guest processors 218. The resource manager 216 may allocate the local application threads 320L to local guest processors 218L and the remote application threads 320R to the remote guest processors 218R. Further, the local guest processors 218L interact with the local virtual processors 212L and the remote guest processor 218R interacts with the remote virtual processor 212R to execute the application threads 320. Consequently, the local physical processors 112L execute the local application threads 320L allocated to the local guest processors 218L and the remote physical processor 112R executes the remote application threads 320R allocated to the remote guest processor 218R.

Figure 2B:
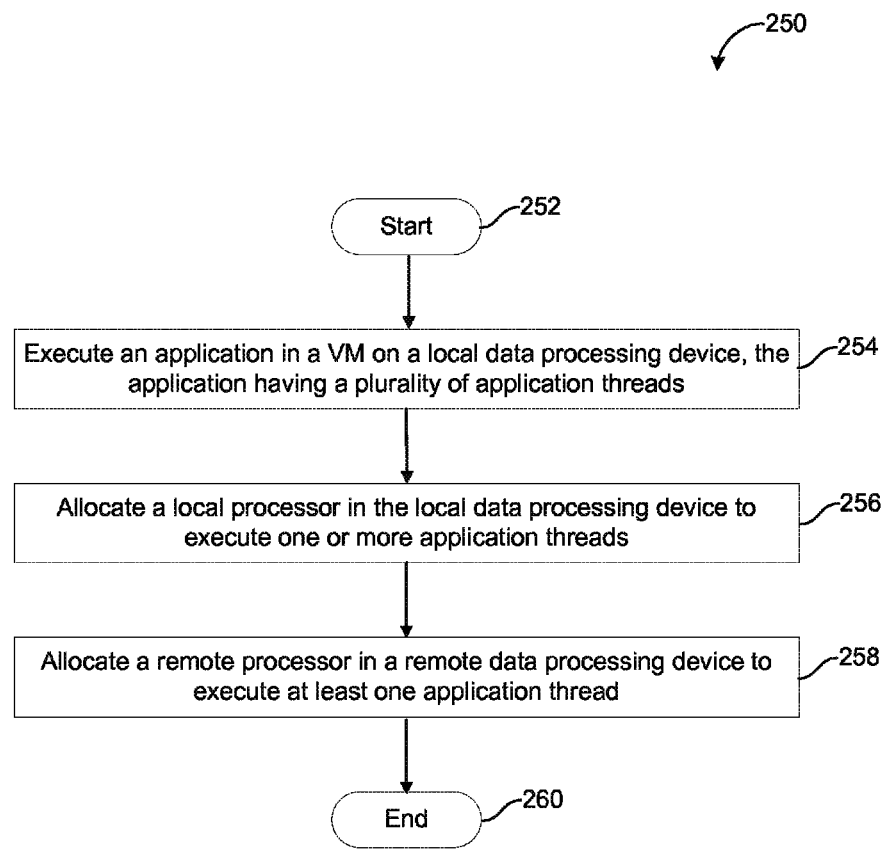
FIG. 2B is an example arrangement of operations for executing a software application in the example virtual machine depicted in FIG. 2A.

FIG. 2B depicts a method 250 for executing an application 310 in the virtual machine 210. At 254 a local data processing device 110L executes instructions to implement the virtual machine 210. The virtual machine 210 in turn executes the application 310 that includes application threads 320. At 256, the resource manager 216 and virtual machine manager 214 allocate the local application threads 320L to the local physical processors 112L in the local data processing devices 110L. The local physical processors 112L execute the local application threads 320L. At 258, the resource manager 216 and the virtual machine manager 214 allocate the remote application threads 320R to the remote physical processor 112R in the remote data processing device 110R. The remote physical processor 112R executes the remote application threads 320R.

FIG. 3A illustrates an example implementation of a virtual machine 210. The virtual machine 210 includes a resource manager 216, virtual processors 212 and a virtual machine manager 214. The resource manager 216 allocates the local application threads 320L to the local virtual processors 212L. The virtual machine manage 214 maintains a mapping of the local virtual processors 212L to the local physical processors 112L. The local virtual processors 212L emulate the physical processors 112L in the local data processing device 100L. In the example of FIG. 3A, the application 310 initially includes local application threads 320L but while the application 310 is executing, the application 310 generates additional remote application threads 320R.

The virtual machine manager 214 determines whether the local virtual processors 212L are capable of executing the additional remote application threads 320R. When the virtual machine manager 214 determines that the local virtual processors 212L are not capable of executing the additional remote application threads 320R, then the virtual machine manager 214 instantiates the remote virtual processor 212R. The virtual machine manager 214 maps the remote virtual processor 212R to the remote physical processor 112R. Therefore, virtual machine manager 214 can instantiate the remote virtual processor 212R even if there are no available local physical processors 112L.

In some implementations, the virtual machine manager 214 includes a load determiner 214a, a load threshold 214b and a virtual processor instantiator 214c. The load determinor 214a determines a current load of the virtual processors 212. The load determinor 214a may determine the current load of the virtual processors 212 by determining the number of application threads 320 and dividing the number of application threads 320 by the number of virtual processors 212 that are currently instantiated. In the example of FIG. 3A, there are two local virtual processors 212L that are currently instantiated and there are eight applications threads 320L. The load determinor 214a may determine the load by dividing the number of application threads 320 (eight) by the number of local virtual processors 212L (two) currently instantiated. In this example, the load is four application threads 320 per virtual processor 212 (8/2=4).

The load threshold 214b may include a maximum number of application threads 320 that a virtual processor 212 is permitted to execute. For example, the load threshold 214b may state that each virtual processor 212 is permitted to execute a maximum of five application threads 320. Since the current load is four application threads per virtual processor, the current load is less than the maximum load threshold of five application threads 320 per virtual processor 212. However, when the application 310 generates the additional remote application threads 320R, the current load threshold increases from four applications threads 320 per virtual processors 212 to six application threads 320 per virtual processors 212 (6=12/2). The new current load of six application threads 320 per virtual processor 212 exceeds the load threshold of five application threads 320 per virtual processor 212.

The virtual processor instantiator 214c instantiates a remote virtual processor 212R in response to the current load (e.g., 6 application threads per virtual processor) exceeding the maximum load threshold 214b (e.g., 5 application threads per virtual processor). The newly-instantiated remote virtual processor 212R emulates a remote physical processor 112R in a remote data processing device 110R of a remote collection 100R. After the remote virtual processor 212R is instantiated, the resource manager 216 may reallocate the application threads 320 in order to balance the load on each virtual processor 212. After reallocating the application threads 320, the current load becomes four applications threads per virtual processors (12/3=4). Since the current load is now lower than the load threshold 214b of five application threads per virtual processor, the virtual machine manager 214 may not instantiate another virtual processor 212.

In some implementations, the load determiner 214a determines the current load of the existing virtual processors 212 by measuring an amount of time that the virtual processors 212 are busy. The load threshold 214b may include a first threshold percentage (e.g., 80%). If the percentage of time that the virtual processors 212 are busy is above the first threshold percentage, then the virtual machine manager 214 may instantiate additional remote virtual processors 212R. The load threshold 214b may include a second threshold percentage (e.g., 20%). If the percentage of time that the virtual processors 212 are busy is below the second threshold percentage, then the virtual machine manager 214 may remove one or more virtual processors 212. The virtual machine manager 214 may instantiate or remove virtual processors 212 to maintain the percentage of busy time within the second threshold percentage and the first threshold percentage (e.g., 20-80%).

In other implementations, the load determiner 214a may use an amount of idle time instead of the amount of busy time to add or remove virtual processors 212. If the percentage of time that the virtual processors 212 are idle is above a third threshold percentage (e.g., 80%), then the virtual machine manager 214 may remove virtual processors 212. The virtual machine manager 214 may start by removing remote virtual processors 212R. Similarly, if the percentage of time that the virtual processors 212 are idle is below a fourth threshold percentage (e.g., 20%), then the virtual machine manager 214 may add one or more virtual processors 212. The virtual machine manager 214 may instantiate or remove virtual processors 212 to maintain the percentage of idle time within the fourth threshold percentage and the third threshold percentage (e.g., 20-80%).

FIG. 3B illustrates a method 350 for executing a software application 310 having application threads 320. At 354, the resource manager 216 and/or the virtual machine manager 214 determine the number of application threads 320. The resource manager 216 allocates the application threads 320 to the virtual processors 212 that are currently instantiated, at 356. For example, the resource manager 216 may allocate the local application threads 320L to the two local virtual processors 212L, as exemplified in FIG. 3A. At 358, the virtual machine manager 214 determines a current load on each virtual processor 212 that is currently instantiated. For example, the virtual machine manager 214 may determine the current load of the two local virtual processors 212L.

As discussed above, in some implementations, the virtual machine manager 214 may determine the current load of the two local virtual processors 212 by dividing the number of local application threads 320L by two. Other methods for determining the current load are also possible, for example by determining an amount of idle time or amount of busy time of the virtual processors 212. For example, the virtual machine manager 214 may take into account the complexity of each application thread 320, the number of executable instructions in each application thread 320, the lines of software code in each application thread 320, the number of APIs invoked by each application thread 320 and/or the reliance of each application thread 320 on user input.

At 360, the virtual machine manager 214 determines whether the current load of any instantiated virtual processor 212 exceeds a load threshold, for example the load threshold 214b. If the current load of any virtual processor 212 that is currently instantiated exceeds the load threshold 214b then the virtual machine manager 214 instantiates a remote virtual processor 212R, at 362. At 364, the virtual machine manager 214 maps or associates the remote virtual processor 212R with a remote physical processor 112R. The remote virtual processor 212R emulates the remote physical processor 112R.

Figure 3C:
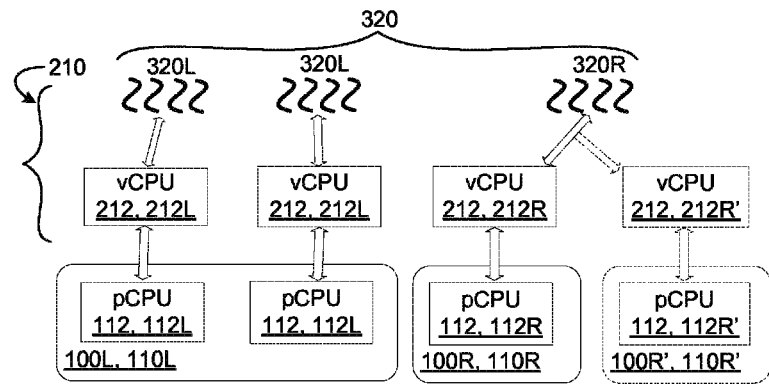
FIG. 3C is a block diagram of an example system for replicating virtual processors of a virtual machine.

Referring to FIG. 3C, in some implementations, the virtual machine manager 214 replicates the remote data processing device 110R by instantiating a replicated data processing device 110R'. The replicated data processing device 110R' is a replica of the remote data processing device 110R. The replicated data processing device 110R' includes the same hardware components as the remote data processing device 110R. Furthermore, the replicated data processing device 110R' executes the same operating system as the remote data processing device 110R. In the example of FIG. 3C, the replicated data processing device 110R' is in another remote collection 100R'. In other words, the replicated data processing device 110R' and the remote data processing device 110R are in different remote collections 100R, thereby decreasing the chances of the replicated data processing device 110R' suffering from the same problems as the remote data processing device 110R. For example, a power outage may not affect both the remote collections 100R and 100R'. However, in other implementations, the replicated data processing device 110R' may be in the same remote collection 100R as the remote data processing device 110R.

The virtual machine manager 214 instantiates a replicated virtual processor 212R'. The replicated virtual processor 212R' is a replica of the remote virtual processor 212R. The virtual machine manager 214 maps the replicated virtual processor 212R' to the replicated data processing device 110R', so that the replicated virtual processor 212R' emulates a replicated physical processor 112R'. The replicated physical processor 112R' may be of the same type and architecture as the remote physical processor 112R.

In some implementations, the resource manager 216 directs the remote application threads 320R to both the remote virtual processor 212R and the replicated virtual processor 212R'. Both the remote virtual processor 212R and the replicated virtual processor 212R' execute the remote application threads 320R. Further, both the remote virtual processor 212R and the replicated virtual processor 212R' return the results of executing the remote application threads 320 to the resource manager 216. The resource manager 216 uses the results from whichever virtual processor 212R or 212R' that returns the results first.

In other example implementations, the virtual machine manager 214 uses the replicated virtual processor 212R' and the replicated data processing device 110R' as a backup for the remote virtual processor 212R and the remote data processing device 112R, respectively. The remote virtual processor 212R and/or the remote data processing device 110R may be more prone to failure than local virtual processors 212L and the local data processing devices 110L due to network congestion and/or latency. The virtual machine manager 214 monitors a health status of the remote virtual processor 212R and/or the remote data processing device 110R. If the health status changes from healthy to unhealthy, then the virtual machine manager 214 switches from the remote virtual processor 212R to the replicated virtual processor 212R'.

In some implementations, the virtual machine manger 214 switches from the remote virtual processor 212R to the replicated virtual processor 212R' after a threshold amount of time has passed since the last communication with the remote data processing device 110R. For example, the virtual machine manager 214 may switch ten seconds after not receiving a communication signal from the remote data processing device 110R. Other threshold amounts of time are also contemplated. In other implementations, the virtual machine manager 214 may switch to the replicated data processing device 110R' immediately after the virtual machine manager 214 detects a failure of the remote data processing device 110R.

Figure 3D:
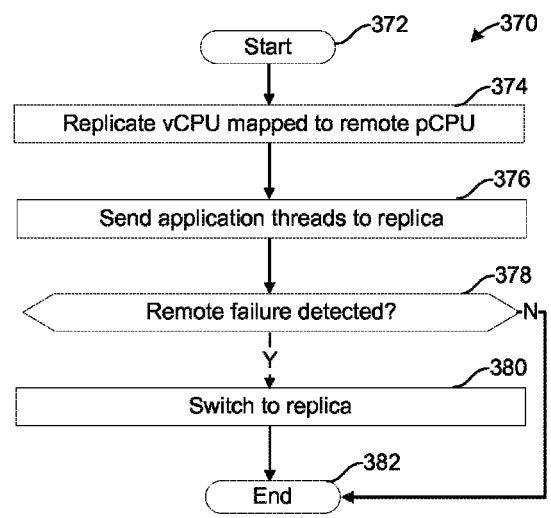
FIG. 3D is an example arrangement of operations for replicating a remote virtual processor and a remote data processing device.

FIG. 3D depicts a method 370 for replicating a remote data processing device, for example, the remote data processing device 110R. At 374, the virtual machine manager 214 replicates the remote virtual processor 212R by instantiating the replicated virtual processor 212R'. The virtual machine manager 214 maps the replicated virtual processor 212R' to the replicated physical processor 112R' in the replicated data processing device 110R'. At 376, the resource manager 216 sends the remote application threads 320R to the replicated virtual processor 212R'. At 378, the virtual machine manager 216 determines whether the remote virtual processor 212R, the remote physical processor 112R and/or the remote data processing device 110R have failed or become unresponsive. If the virtual machine manager 214 detects the failure or unresponsiveness then at 380 the virtual machine manager 214 switches from the remote virtual processor 212R to the replicated virtual processor 212R'. Consequently, the virtual machine manager 214 switches from the remote data processing device 110R to the replicated data processing device 110R'.

In some implementations, the virtual machine manager 214 may restart the failed or unresponsive remote virtual processor 212R, remote physical processor 112R and/or remote data processing device 110R. In other implementations, the virtual machine manager 214 removes the failed or unresponsive remote virtual processor 212R, instantiates a new virtual processor 212 and associates the newly-instantiated virtual processor with a different remote physical processor than the failed or unresponsive remote physical processor 112R. The virtual machine manager 214 may use the newly-instantiated virtual processor as a backup for the replicated virtual processor 212R' that has taken over the failed or unresponsive remote virtual processor 212R.

Figure 4C:
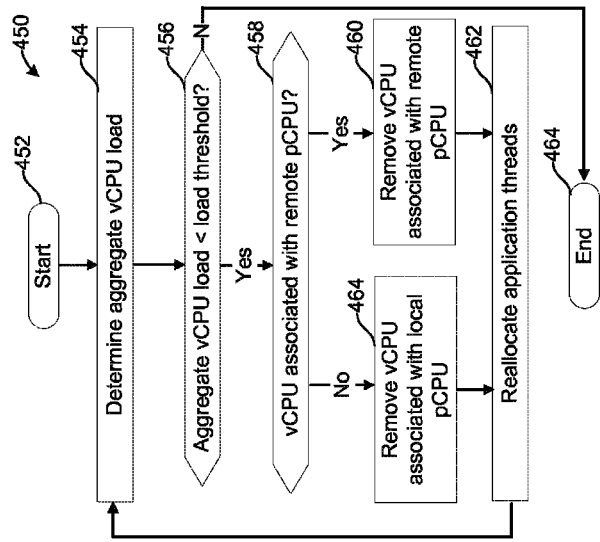
FIG. 4C is an example arrangement of operations for removing virtual processors from a virtual machine while the virtual machine is executing a software application with application threads.
Figure 4A:
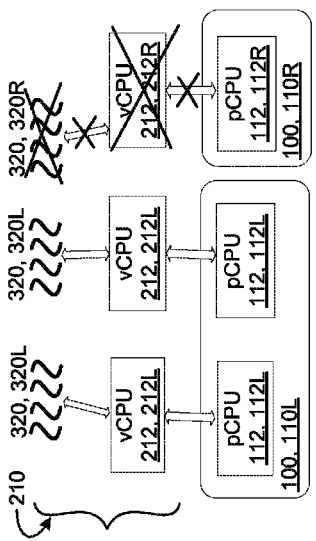
FIG. 4A and 4B are block diagrams of virtual processors of a virtual machine interfaced with physical processors in local and remote data processing devices.
Figure 4B:
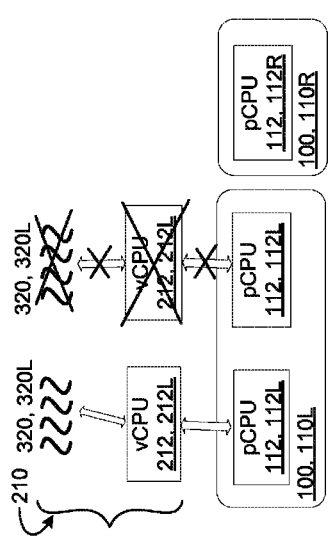

Referring to FIG. 4A, 4B and 4C, the number of application threads 320 may decrease while the application 310 is executing in the virtual machine 210. The number of application threads 320 may decrease when fewer users are using the application 310, less data is being received by the application 310 or when the application 310 is performing a relatively simple task. As the number of application threads 320 decreases, the load on each virtual processor 212 decreases. When the load on the virtual processors 212 decreases below a minimum load threshold, then the virtual machine manager 214 may remove one or more virtual processors 212 from the virtual machine 210. In some implementations, the virtual machine manager 214 removes all remote virtual processors 212R before removing a local virtual processor 212L.

When the virtual machine manager 214 removes a virtual processor 212, the virtual machine manager 214 dissociates the physical processor 112 that was associated with the virtual processor 212. The dissociated physical processor 112 may be used by another virtual machine 210. By removing an idle or a relatively idle virtual processor 212, the virtual machine manager 214 mitigates waste of physical processors 112. Moreover, a dissociated remote physical processor 112R may be used as a local physical processor 112L by a virtual machine 210 executing on one of the remote data processing devices 110R in the remote collection 100R. Therefore, by removing a remote virtual processor 212R before removing any local virtual processors 212L, the virtual machine manager 214 makes the remote physical processor 112R available sooner for another virtual machine 210 executing in the remote collection 100R.

As depicted in FIG. 4A and 4B, when the current load on the virtual processors 212 is below a minimum load threshold, the virtual machine manager 214 removes the remote virtual processor 212R that emulates the remote physical processor 112R. If after removing the remote virtual processor 212R the current load is still below the minimum load threshold, then the virtual machine manager 214 removes a local virtual processor 212L that emulates a local physical processor 112L.

FIG. 4C depicts a method 450 for removing virtual processors 212 from a virtual machine 210. At 454, the virtual machine manager 214 determines a current load of the virtual processors 212. At 456, the virtual machine manager 214 determines whether the current load is below a minimum load threshold. If the current load is below the minimum load threshold, then at 458 the virtual machine manager 214 determines whether any one of the virtual processors 212 is emulating a remote physical processor 112R.

If any of the virtual processors 212 is emulating a remote physical processor 112R, then at 460 the virtual machine manager 214 removes the remote virtual processor 212R that is emulating the remote physical processor 112R. If, however, the virtual machine manager, 214, determines that no virtual processor 212 is associated with a remote physical processor 112R, then the virtual machine manager 214 removes a local virtual processor 212L that is emulating a local physical processor 112L, at 454.

After the virtual machine manager 214 removes a virtual processor 212, the resource manager 216 reallocates the application threads 320 among the remaining virtual processors 212. The virtual machine manager 214 determines the new current load of the virtual processors 212 after the resource manager 216 reallocates the application threads 320. The virtual machine manager 214 continues to remove virtual processors 212 until the current load is above the minimum load threshold.

Figure 5:
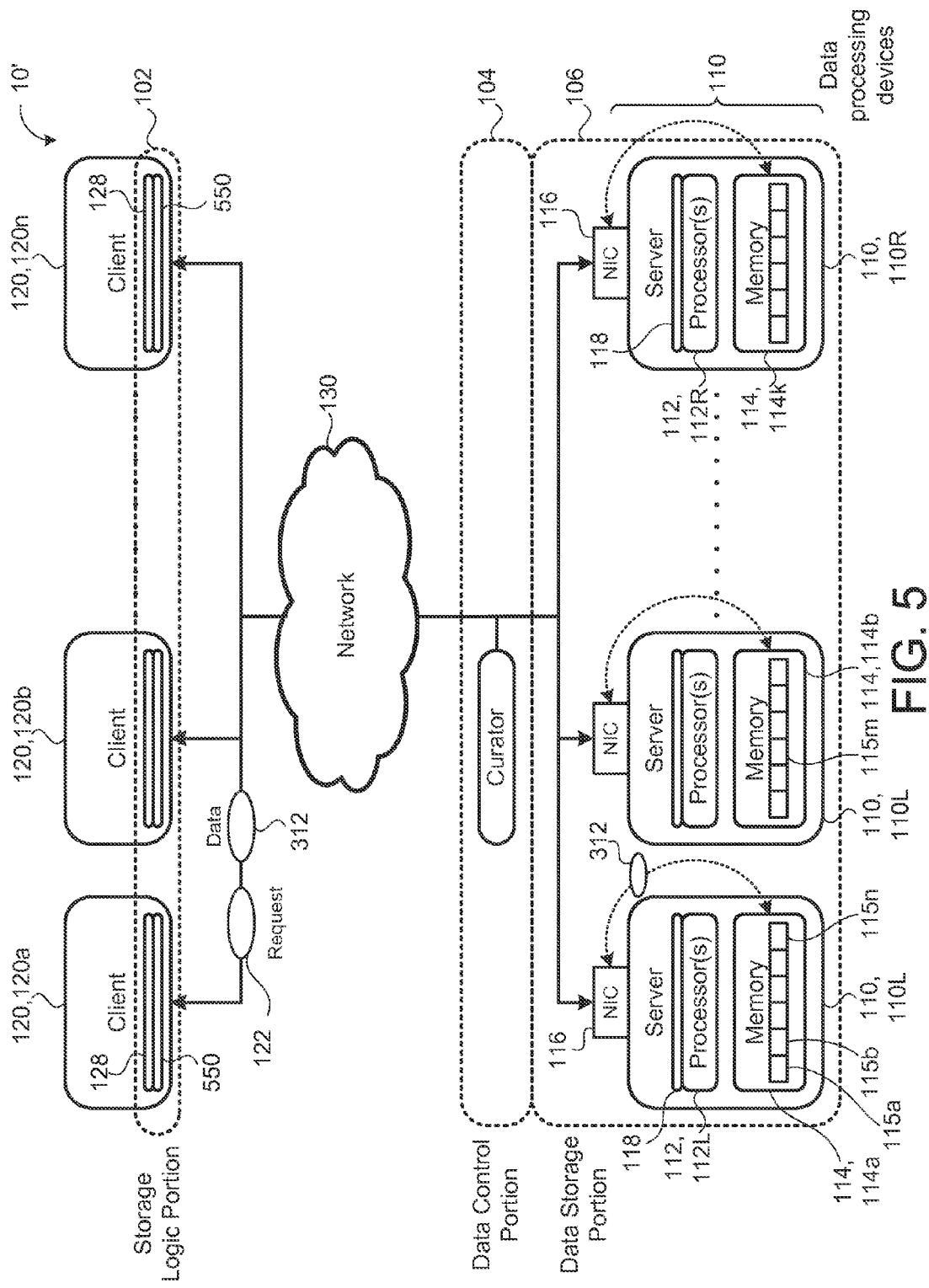
FIG. 5 is a schematic view of an example distributed computing system.

Referring to FIG. 5, in some implementations, a distributed system 10' includes loosely coupled data processing devices 110 (e.g., computers or servers), each having a physical processor 112 (e.g., one or more central processing units (CPUs) or other computing resource) in communication with storage resources 114 (e.g., memory, flash memory, dynamic random access memory (DRAM), phase change memory (PCM), and/or disks having spindles) that may be used for caching data 312. A storage abstraction (e.g., key/value store or file system) overlain on the storage resources 114 allows scalable use of the storage resources 114 by one or more clients 120, 120*a-n*. The clients 120 may communicate with the data processing devices 110 through a network 130 (e.g., via RPC). A virtual machine executing in the distributed system 10' may use a first storage resource 114*a* and a second storage resource 114*b*. However, the virtual machine may present the first storage resource 114*a* and the second storage resource 114 as a single contiguous block of memory to a resource manager and/or a software application executing on the virtual machine.

The distributed system 10' may include multiple layers of redundancy where data 312 is replicated and/or encoded and stored in multiple data centers. Data centers (not shown) house computer systems and their associated components, such as telecommunications and storage systems. Data centers usually include backup power supplies, redundant communications connections, environmental controls (to maintain a constant temperature), and security devices. Data centers may be large industrial scale operations that use a great amount of electricity (e.g., as much as a small town). Data centers may be located in different geographical locations (e.g., different cities, different countries, and different continents). In some examples, the data centers, or portions thereof, requires maintenance (e.g., due to a power outage or disconnecting a portion of the storage system for replacing parts, or a system failure, or a combination thereof). The data 312 stored in these data centers, and in particular, the distributed system 10' may be unavailable to users/clients 120 during the maintenance period resulting in the impairment or halt of a user's operations. Therefore, it is desirable to provide a distributed system 10' capable of efficiently using the storage resources 114 of the data processing devices 110 during a maintenance and/or certain data center hardware/software failures without moving the data 312 in advance of such a maintenance or failure. The system 10' may adjust a load of the available resources, and jobs of the adjusted load may be executed in a predefined order, such as high-availability jobs before the low-availability jobs.

In some implementations, the distributed system 10' is "single-sided," eliminating the need for any server jobs for responding to remote procedure calls (RPC) from clients 120 to store or retrieve data 312 on their corresponding data processing devices 110 and may rely on specialized hardware to process remote requests 122 instead. "Single-sided" refers to the method by which most of the request processing on the data processing devices 110 may be done in hardware rather than by software executed on physical processors 112 of the data processing devices 110. Rather than having a physical processor 112 of a data processing device 110 (e.g., a server) execute a server process 118 that exports access of the corresponding storage resource 114 (e.g., non-transitory memory) to client processes 128 executing on the clients 120, the clients 120 may directly access the storage resource 114 through a network interface controller (NIC) 116 of the data processing device 110. In other words, a client process 128 executing on a client 120 may directly interface with one or more storage resources 114 without requiring execution of a routine of any server processes 118 executing on the physical processors 112. This single-sided distributed storage architecture offers relatively high-throughput and low latency, since clients 120 can access the storage resources 114 without interfacing with the physical processors 112 of the data processing devices 110. This has the effect of decoupling the requirements for storage 114 and CPU cycles that typical two-sided distributed systems carry. The single-sided distributed system 10' can utilize remote storage resources 114 regardless of whether there are spare CPU cycles on that data processing device 110; furthermore, since single-sided operations do not contend for server physical processor 112 resources, a single-sided system can serve cache requests 122 with very predictable, low latency, even when data processing devices 110 are running at high CPU utilization. Thus, the single-sided distributed system 10' allows higher utilization of both cluster storage 114 and physical processor 112 resources than traditional two-sided systems, while delivering predictable, low latency.

In some implementations, the distributed system 10' includes a storage logic portion 102, (e.g., encoding system 102), a data control portion 104, and a data storage portion 106. The storage logic portion 102 may include a transaction application programming interface (API) 550 (e.g., a single-sided transactional system client library) that is responsible for accessing the underlying data 312, for example, via RPC or single-sided operations. The data control portion 104 may manage allocation and access to storage resources 114 with tasks, such as allocating storage resources 114, registering storage resources 114 with the corresponding network interface controller 116, setting up connections between the client(s) 120 and the data processing devices 110, handling errors in case of machine failures, etc. The data storage portion 106 may include the loosely coupled data processing devices 110, 110*a-k*.

The distributed system 10' may store data 312 in dynamic random access memory (DRAM) 114 and serve the data 312 from the remote data processing device 110R via remote direct memory access (RDMA)-capable network interface controllers 116. A network interface controller 116 (also known as a network interface card, network adapter, or LAN adapter) may be a computer hardware component that connects a physical processor 112 to the network 130. Both the data processing devices 110*a-k* and the client 120 may each have a network interface controller 116 for network communications. A host process 118 executing on the physical processor 112 of the data processing device 110 registers a set of remote direct memory accessible regions 115a-n of the memory 114 with the network interface controller 116. The host process 118 may register the remote direct memory accessible regions 115a-n of the memory 114 with a permission of read-only or read/write. The network interface controller 116 of the data processing device 110 creates a client key 302 for each registered memory region 115a-n.

The single-sided operations performed by the network interface controllers 116 may be limited to simple reads, writes, and compare-and-swap operations, none of which may be sophisticated enough to act as a drop-in replacement for the software logic implemented by a traditional cache server job to carry out cache requests and manage cache policies. The transaction API 550 translates commands, such as look-up or insert data commands, into sequences of primitive network interface controller operations. The transaction API 550 interfaces with the data control and data storage portions 104, 106 of the distributed system 10'.

The distributed system 10' may include a co-located software process to register memory 114 for remote access with the network interface controllers 116 and set up connections with client processes 128. Once the connections are set up, client processes 128 can access the registered memory 114 via engines in the hardware of the network interface controllers 116 without any involvement from software on the local physical processors 112 of the corresponding local data processing devices 110L.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A system comprising:
    a collection of local data processing devices; and
    a collection of remote data processing devices;
    wherein at least one local data processing device executes instructions configuring the at least one local data processing device to implement:
        a resource manager associating application threads of a software application executing on a data processing device with processors by:
            allocating application threads among local processors;
            maintaining a threshold range of application threads associated with each local processor by instantiating or removing local processors when the number of application threads per local processor is outside the threshold range; and
            when all the local processors have been instantiated:
                instantiating one or more remote processors;
                allocating application threads among the one or more remote processors; and
                removing all the remote processors before removing a local processor;
        a virtual machine comprising a plurality of virtual processors, each virtual processor emulating a data processing device, the virtual machine associating local processors with virtual processors; and
        a virtual machine manager associating at least one virtual processor with a local data processing device and at least one virtual processor with a remote data processing device.

2. The system of claim 1, wherein the virtual machine manager:
    determines a number of application threads;
    determines a number of virtual processors of the virtual machine;
    compares the number of application threads with the number of virtual processors;
    instantiates one or more additional virtual processors based on the comparison;
    configures the additional one or more virtual processors to emulate corresponding remote data processing devices; and
    assigns one or more application threads to the additional one or more virtual processors.

3. The system of claim 1, wherein the virtual machine instantiates or removes virtual processors to maintain a one-to-one association of local processors to virtual processors.

4. The system of claim 1, wherein the resource manager migrates all application threads executing on the remote processors to the local processors before removing the remote processors.

5. The system of claim 1, wherein the virtual machine manager replicates the remote data processing device by instantiating a replica of the remote data processing device.

6. The system of claim 1, wherein:
the remote data processing device comprises a non-transitory remote memory; and
the virtual machine is configured to directly access the non-transitory remote memory without communicating with the remote processors.

7. A system comprising:
a collection of local data processing devices; and
a collection of remote data processing devices;
wherein at least one local data processing device executes instructions configuring the at least one local data processing device to implement:
  a resource manager configured to associate application threads of a software application executing on a data processing device with local processors;
  a virtual machine comprising a plurality of virtual processors, each virtual processor emulating a data processing device, the virtual machine associating local processors with virtual processors; and
  a virtual machine manager associating at least one virtual processor with a local data processing device and at least one virtual processor with a remote data processing device,
  wherein the virtual machine manager:
    replicates the remote data processing device by instantiating a replica of the remote data processing device;
    determines an amount of time that has passed since a last communication with the remote data processing device; and
    switches the virtual processor executing on the remote data processing device to the replica of the remote data processing device, in response to the amount of time exceeding a threshold period of time.

8. A computer-implemented method comprising:
executing instructions on a local data processing device to implement a virtual machine comprising a plurality of virtual processors;
associating one or more of the virtual processors with local processors in the local data processing device;
associating at least one virtual processor with a remote processor in a remote data processing device; and
associating application threads of a software application executing on a data processing device with processors by:
  allocating application threads among local processors;
  maintaining a threshold range of application threads associated with each local processor by instantiating or removing local processors when the number of application threads per local processor is outside the threshold range; and
  when all the local processors have been instantiated:
    instantiating one or more remote processors;
    allocating application threads among the one or more remote processors; and
    removing all the remote processors before removing a local processor.

9. The computer-implemented method of claim 8, further comprising:
executing a software application in the virtual machine, the software application having a plurality of application threads;
associating at least one application thread with the local processor in the local data processing device; and
associating at least another application thread with the remote processor in the remote data processing device.

10. The computer-implemented method of claim 8, further comprising:
determining a number of application threads;
determining a number of virtual processors of the virtual machine;
comparing the number of application threads with the number of virtual processors;
instantiating one or more additional virtual processors based on the comparison;
configuring the additional one or more virtual processors to emulate corresponding remote processors in a remote data processing device; and
assigning one or more application threads to the additional one or more virtual processors.

11. The computer-implemented method of claim 8, wherein the maintaining comprises instantiating or removing virtual processors to maintain a one-to-one association of local processors to virtual processors.

12. The computer-implemented method of claim 8, further comprising migrating all application threads executing on the remote processors to the local processors before removing the remote processors.

13. The computer-implemented method of claim 8, further comprising replicating the remote data processing device by instantiating a replica of the remote data processing device.

14. The computer-implemented method of claim 8, further comprising accessing a non-transitory remote memory associated with the remote data processing device without communicating with the remote processors.

15. A computer-implemented method comprising:
executing instructions on a local data processing device to implement a virtual machine comprising a plurality of virtual processors;
associating one or more of the virtual processors with local processors in the local data processing device;
associating at least one virtual processor with a remote processor in a remote data processing device;
replicating the remote data processing device by instantiating a replica of the remote data processing device;
determining an amount of time that has passed since a last communication with the remote data processing device; and
switching the virtual processor executing on the remote data processing device to the replica of the remote data processing device, in response to the amount of time exceeding a threshold period of time.

16. A system for executing a virtual machine, the system comprising:
a local data processing device comprising local processors; and
a remote data processing device comprising remote processors;
wherein the local data processing device executes instructions configuring the local data processing device to implement:
  a virtual machine comprising a plurality of virtual processors;
  a software application executing on the virtual machine, the software application having a plurality of application threads;
  a virtual machine manager configured to:
    associate each virtual processor with a corresponding local processor;
    allocate the application threads to the virtual processors;
    determine a current load of the virtual processors;

instantiate an additional virtual processor when the current load exceeds a threshold; and associate the additional virtual processor with a remote processor when all the local processors are already associated with virtual processors; and a resource manager configured to associate application threads with virtual processors by:

allocating application threads among virtual processors associated with local processors;

maintaining a threshold range of application threads associated with each virtual processor associated with a local processor by instantiating or removing virtual processors associated with local processors when the number of application threads per virtual processor associated with a local processor is outside the threshold range; and when all the virtual processors associated with local processors have been instantiated:

allocating application threads among the one or more virtual processors associated with remote processors; and removing all the virtual processors associated with remote processors before removing a virtual processor associated with a local processor.

17. The system of claim 16, wherein the virtual machine manager is further configured to remove the virtual processor associated with the remote processor when the current load is below the threshold.

18. The system of claim 16, wherein the virtual machine manager is configured to determine the current load of the virtual processors by:

determining a number of application threads;

determining a number of virtual processors in the virtual machine; and comparing the number of application threads with the number of virtual processors.

19. The system of claim 16, wherein the virtual machine manager is configured to determine the current load of the virtual processors by determining the number of application threads allocated to the virtual processors.

20. The system of claim 16, wherein:

the remote data processing device further comprises a non-transitory remote memory; and the virtual machine is configured to directly access the remote memory without communicating with the remote processors.

* * * * *